3,044,265
POWER HYDRAULIC BRAKE DEVICE AND SYSTEM

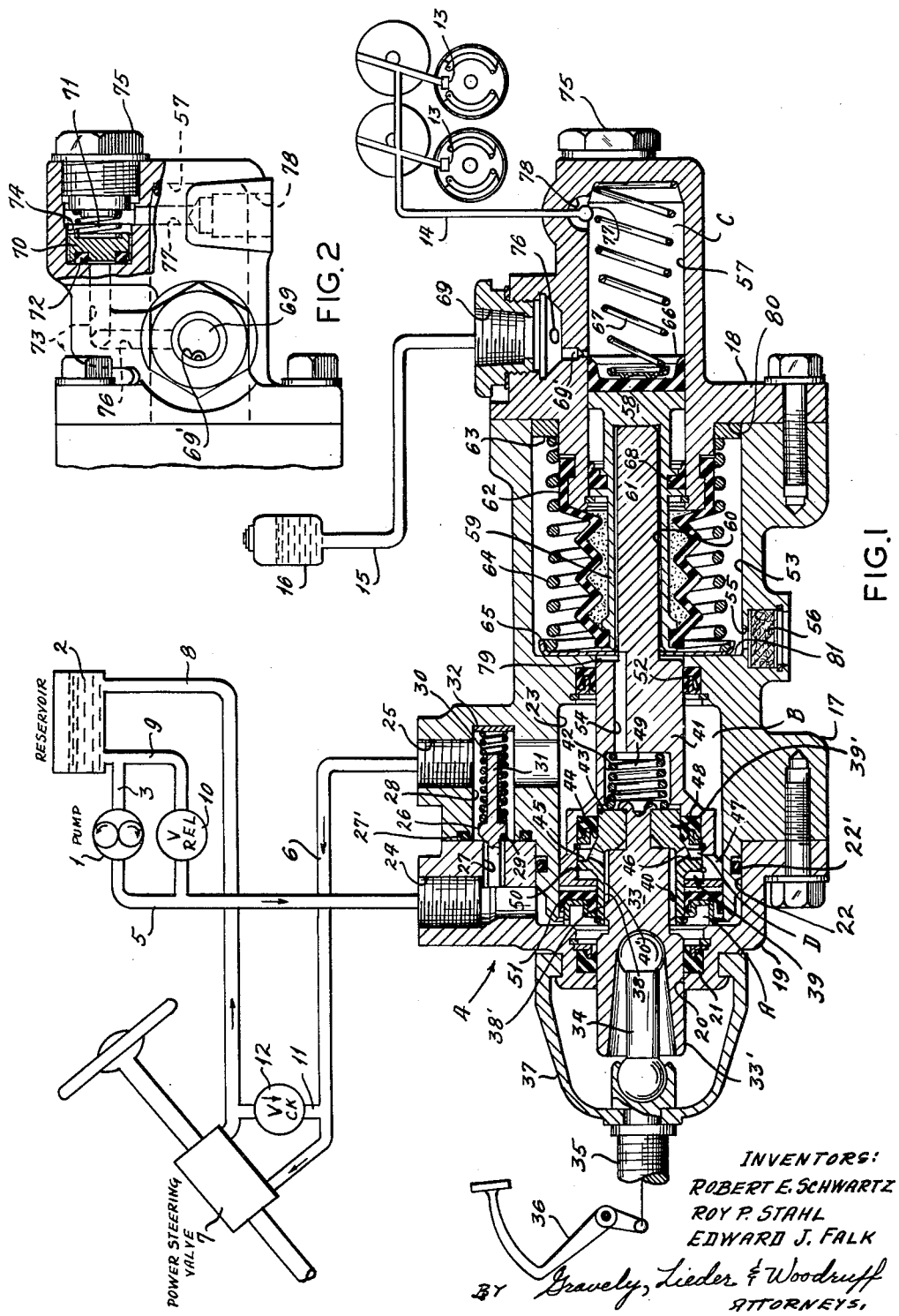

Robert E. Schwartz, Clayton, Mo., Roy P. Stahl, South Bend, Ind., and Edward J. Falk, St. Louis, Mo., assignors to Wagner Electric Corporation, St. Louis, Mo., a corporation of Delaware
Continuation of abandoned application Ser. No. 497,272, Mar. 28, 1955. This application Mar. 15, 1960, Ser. No. 15,221
10 Claims. (Cl. 60—52)

This invention relates to power hydraulic systems and the controlling means therefor, and in particular, to a power brake system and servo motor utilizing separate power hydraulic pressure fluid and brake fluid.

In general, this invention comprises an operator controlled servo motor serially arranged with positive displacement pumping means in a power hydraulic system for the actuation of a brake system. It is well known in the industry that a mineral base pressure fluid is preferable as a power hydraulic fluid, but that the best materials known for sealing members and like resilient components for a brake device are attacked by such fluid and have a relatively short life. Accordingly, the best power fluid is not compatible with the best pressure producing fluid for brake actuation, and in the past a compromise fluid has generally been utilized because of the rapid seal deterioration and dilution of one pressure fluid by the other when attempts have been made to use separate power and actuation fluids. However, because of the improved fluid operating characteristics produced by using separate power hydraulic pressure fluid and brake fluid, it is advantageous and desirable to provide an improved servo motor having isolated power and brake actuating portions.

One of the principal objects of the present invention is to provide a servo motor which completely separates the fluid in the series power hydraulic portion of the system from the fluid in the braking portion of the system.

Another object of the present invention is to provide a braking system operated by a servo motor in series with a power system, but which functions independently of the ambient pressure in any section of the power system.

Still another object of the present invention is to provide a servo motor which provides "feel" for the operator. "Feel" is the proportional reactionary force in opposition to the applied force affording the operator an appraisal as to the extent of application.

Another object of the present invention is to provide a servo motor which operates even in the event of power failure to provide safe operation of the braking system.

A still further object is to provide a servo motor having novel pressure fluid compensation means for a brake cylinder portion thereof.

The invention also consists in the parts and in the arrangements and combinations of parts hereinafter described and claimed. In the accompanying drawings which form part of this specification and wherein like numerals and symbols refer to like parts wherever they occur:

FIG. 1 is a diagrammatic view of a power hydraulic braking system with a longitudinal cross-sectional view of the power hydraulic brake device shown therein, and FIG. 2 is a fragmentary cross-sectional view showing the compensation valve of the preferred embodiment in detail.

This is a continuation of copending application, Serial No. 497,272 filed March 28, 1955, now abandoned, for Power Hydraulic Brake Device and System.

Referring to FIG. 1, the power hydraulic system comprises a pumping means 1 having one side connected to a reservoir 2 by a conduit 3 and the pressure side connected to the inlet of the power portion of a servo motor 4 by a conduit 5. A conduit 6 connects the outlet of the power portion of the servo motor 4 with a power steering valve 7 arranged in series with said servo motor 4. The outlet of the steering valve 7 is connected to the reservoir 2 by a conduit 8 which provides a return passage for the oil displaced by the pumping means 1. A conduit 9 having a pressure relief valve 10 interposed therein connects the conduits 3 and 5, the relief valve 10 protecting the pumping means 1 from pressure overload above a predetermined value. A conduit 11 connects the conduits 6 and 8 and has a reverse flow valve 12 interposed therein to facilitate pressure fluid recirculation during a power failure steering application. If desired, the valve 12 may be integral with the power steering valve 7. The braking system includes a plurality of wheel cylinders 13 connected to the brake actuating portion of the servo motor by a conduit 14. A conduit 15 connects a brake fluid reservoir 16 to the servo motor for compensation purposes. According to the present invention, the power system contains a mineral oil base pressure fluid and the braking system contains a typical hydraulic brake fluid.

The servo motor 4 comprises a booster housing 17 having a brake portion housing 18 secured to the right-hand end and defining a pressure producing outlet chamber or master cylinder chamber C, and an intake housing 19 secured to the left-hand end of the booster housing 17 and defining therewith a power portion of the servo motor 4. Th power portion includes an inlet chamber A and an outlet or return chamber B as will be more fully defined hereinafter. The intake housing 19 has a rod receiving bore 20 with a sealing assembly 21 supported therein and an axially aligned counterbore 22. The counterbore 22 receives a leftward extension of the booster housing 17 which has a counterbore 23 therein, the extension supporting an O ring 22' which seals between the booster housing 17 and the counterbore 22. The intake housing 19 also has a vertically disposed inlet 24 to which the conduit 5 from the pumping means 1 is connected and which connects with the inlet chamber A. A return port or outlet 25 connects with the reservoir chamber B defined in part by the counterbore 23 in the booster housing 17. A sleeve type pressure relief valve 26 is interposed between the inlet 24 and outlet 25 and is received in a connecting passage formed by a horizontally disposed bore 27 and an axially aligned counterbore 28, the valve 26 being biased against a seat 29 by a spring 30 which circumscribes a guide extension 31 of the valve 26. The right end of the spring 30 abuts against a compression adjusting spacer 32 interposed between the spring 30 and the right end of the counterbore 28. An O ring 27' provides a seal between the housings 17 and 19 circumscribing the bore 27 and the counterbore 28. The pressure relief valve 26 is provided in by-pass relation with the power chambers A and B and is biased by the predetermined force of the spring 30 into normally sealed position with the seat 29. However, power hydraulic pressures developed in the inlet chamber A by power control means including a piston rod 33 and a throttling valve 39 for actuating a power piston 41 to develop braking pressures in the pressure producing chamber C may act on the effective area of the valve 26 to overcome the force of spring 30 in order to prevent overloading the pumping means 1.

The piston rod 33 includes a leftward portion 33' slidably mounted in the bore 20 and receiving a linkage 34 pivotally mounted between the rod 33 and one end of a push rod 35. The other end of the push rod 35 is operatively connected with suitable actuating means such as an actuating pedal 36 having intermediate linkage (not shown) interposed therebetween. A resilient boot 37 interposed between the push rod 35 and the intake housing 19 prevents the entry of foreign materials, but the effective area of the portion 33' to the left of the seal 21 is subjected to atmospheric pressure.

The rod 33 extends coaxially into a counterbore 38 of a leftward sleeve portion 38' of the throttling valve 39 and is spaced therefrom by a plurality of ears 40 to provide an annular passage 40' in communication with the inlet chamber A. The right end of the rod 33 is secured to the valve 39. The power piston 41 is slidably positioned in the counterbore 23 and divides the power chamber into the inlet and outlet chambers A and B. The piston 41 includes an inner bore 42, an intermediate bore 43, and an outer bore 44. The valve 39 is positioned in the outer bore 44 and has a radially-extending annular flange 45 therein and the valve 39 also includes a rightward portion 39' extending into the intermediate bore 43 of the power piston 41. A plurality of angularly arranged passages 46 are formed in the valve 39 connecting the counterbore 38 with the outer bore 44, and the outer circumferential portion at the left end of piston 41 having a plurality of throttling passages 47 providing communication between the outer bore 44 and the chamber B. The passages 47 form a throttling passage D in combination with the radial flange 45 of the throttling valve 39.

A seal assembly 48 is provided in the outer bore 44 between the bore 44 and the periphery of the rightward portion 39' of the valve 39. The rightward portion 39' and the leftward portion 33' of the piston 33 have the same diameters and therefore have the same effective end areas outwardly of the seals 48 and 21, respectively. In order to provide a balanced power piston arrangement as taught herein, it is necessary to subject these effective areas to the same surrounding or ambient pressure which in this case is atmospheric. A spring 49 of negligible force is mounted in the inner bore 42 biasing the radial flange 45 of the valve 39 leftwardly to its open or unrestricted position abutting a stop ring 50 supported in the outer bore 44. It will be noted that the stop member 50 is positioned intermediate the axial extent of throttling passages 47, and that the radial flange 45 is movable with the throttling valve 39 to a throttling position restricting but not closing the passage D. In both positions, the leftward side of the radial flange 45 is subjected to the same fluid pressure that prevails in return chamber B and the rightward side of the flange 45 is subjected to chamber A fluid pressures. The opposed effective areas of the piston rod 33 and throttling valve 39 between the seals 21 and 48 are equal.

The valve 39 carries a seal assembly 51 which extends into sealed condition with the counterbore 23 at the left end of the piston 41 and seals between the chambers A and B, the seal assembly 51 having a retainer member to keep the sealing cup in sealing position. The retainer acts as a stop member for the piston rod 33 and throttling valve 39 against the left end of the intake bore 22, and is also perforated for the free passage of power hydraulic fluid. The opposite effective areas of the power piston 41 in chambers A and B and across the sealing cup 51 are equal. Another sealing assembly 52 is positioned in the right end of the counterbore 23 and provides a seal around the piston 41, the seal 52 and each of the other seals in the power portion of the servo motor being of a material adapted for long life with mineral oil base power fluid.

A fluid separation counterbore or chamber 53 is axially aligned with the counretbore 23 and is in communication with the inner bore 42 of the piston 41 by means of a passage 54, the passage being an escape for any pressure fluid which might leak past the sealing assembly 48. A passage 55 having an air filter 56 is vertically disposed in the booster housing 17 in communication with the separation chamber 53 at the left end thereof and provides a drain for any fluids which might collect in the separation chamber 53. It is apparent that the rightward portion 39' of the throttling valve 39 is subjected to atmospheric pressure to offset or balance the equal and opposite force on the leftward end of the portion 33' of the piston rod 33. It is also apparent that atmospheric pressure acts on the effective area of the power piston 41 in the bore 42 and this area is balanced by an equal effective area of the piston 41 in the separation chamber 53 outwardly of the seal 52.

The brake housing 18 partially extends into the counterbore 53 having a bore 57 which defines the outlet chamber C at the right end thereof, and which slidably receives a master cylinder portion 58 which is retained therein by suitable means. The piston 58 has a leftward sleeve or annular projection 59 with a long recess or bore 60 to receive an extension 61 of the power piston 41. The extension 61 and sleeve 60 have an axial extent of sufficient length to assure rectilinear actuation of the piston 58 in the chamber C. It is apparent that the pistons 41 and 58 may be integral so that the power piston has an extension with a piston working end in the outlet chamber C. A resilient boot 62 is interposed between the sleeve 59 and the brake housing 18 in circumscribing relation therewith and prevents the entry of foreign matter. An annular spacer 63 is positioned against the right end wall 80 of the counterbore 53, and a spring 64 extends from the spacer against a retainer 65 carried by the extension 61 and interposed in a step 79 formed between adjacent vertical walls of the pistons 41 and 58. The spring 64 is of negligible force only great enough to bias the retainer 65 against the left end wall 81 of the separation chamber 53 adjacent to the power portion of the servo motor 4 for returning the power piston 41 to inoperative or retracted position. The retainer 65 may function as a deflector or drip guard to prevent flow of any power hydraulic fluid seeping past seal 52 from migrating along the piston sleeve 59.

A primary seal 66 is provided in chamber C for the working end of the piston 58 and a spring and retainer assembly 67 biases the seal 66 into an abutting relationship with the piston 58. The sleeve 59 also carries a secondary seal 68 in sealing contact with the bore 57, the seal 68 being formed of a material to seal brake fluid. It is apparent from FIG. 1 that the separation chamber 53 has an axial extent greater than the maximum stroke of the pistons 41 and 58, and that the piston surfaces sealed by sealing assemblies 52 and 68 are never in contact with other surfaces whereby transfer of power and brake fluids is prevented.

A reservoir port 69 is vertically disposed in the brake housing 18 for compensation purposes. One end of the port 69 receives the conduit 15 and the other end 69' intersects the bore 57 adjacent to the lip of the seal 66 in its normal inoperative position. In FIG. 2, a compensation valve 70 is biased by a spring 71 into a seat 72 formed by the juncture of a bore 73 and an axially aligned counterbore 74 horizontally disposed in the brake housing 18, the right end of said spring 71 abutting against an end plug 75 fixedly received in the counterbore 74. The left end of the bore 73 is connected to the reservoir port 69 by a cross-drilled passageway 76. Another cross-drilled passage 77 is provided in the brake housing 18, one end thereof intersecting the counterbore 74, the mid-portion thereof being in communication with the bore 57, and the other end forming a brake port 78. The brake port 78 receives the conduit 14, FIG. 1, connecting the bore 57 with the brake assemblies.

In this series system, the pressure relief valve 10 actuates at a pressure equal to the sum of the maximum pressure differentials allowed across the individual servo motors thereby protecting the pumping means 1 from pressure overloads. Pressure overloading of the pumping means 1 develops when the servo motor 4, or other servo motors of other devices such as steering valve 7, exceeds the predetermined maximum pressure differential assigned thereto. The servo motor 4 is provided with a pressure relief valve 26 which limits the magnitude of the maximum pressure differential allowed thereacross. However, the fluid pressure existing in a servo motor at any time is effective upon every servo motor of prior position in the system. For instance, if the steering valve 7 is actuated, the pressure differential created thereacross causes a back pressure which is effective throughout the servo motor 4 and against which the pumping means 1 must work. Ordinarily, a servo motor of prior position would be actuated by this back pressure. However, the servo motor 4 is balanced to prevent such an occurrence, this balancing being achieved by a symmetry of cross-sectional areas which are affected by the aforesaid back pressure. The opposing effective cross-sectional areas of the piston 41, the valve 39, and the valve rod 33 respectively are constructed to be equal and self-cancelling when acted upon by the ambient fluid pressure existing in that particular section of the hydraulic system. Atmospheric pressure is also prevalent acting upon opposing effective cross-sectional areas of the piston 41, and the valve 39 and the valve rod 33. However, the forces thus created are also equal and self-cancelling. Consequently, regardless of the ambient pressure the servo motor 4 is balanced to function independently in the series system.

Assuming the steering valve to be unrestricted, pressure fluid is normally discharged from the pumping means 1 through the conduit 5 and the inlet 24 into the inlet chamber A of the servo motor 4. The pressure fluid flows between the valve rod 33 and the valve 39 through passage 40' and through the passages 46, the outer bore 44, and the normally unrestricted throttling passages 47 into the outlet chamber B. From the outlet chamber B the fluid flows by means of the outlet 25 and the conduit 6 into the power steering valve 7 and is returned to the reservoir 2 through the conduit 8.

When the vehicle operator applies a force to the actuating pedal 36, a throttling force is transmitted to the push rod 35, the linkage 34, the valve rod 33 and the throttling valve 39 which is moved rightwardly restricting pressure fluid flow through the throttling channel D between the flange 45 and the right end of the throttling passages 47. Consequently, a pressure differential is created across the power piston 41 between the chamber B and the portion of the outer bore 44 of the piston 41 between the piston and the throttling valve flange 45 to develop a back pressure against which the pumping means 1 must work. The pressure differential also exists across the sealing cup 51 between the chamber A and the portion of the bore 44 between the seal 51 and the left side of the throttling valve flange 45. In effect, the pressure differential across the piston 41 exists in the chambers A and B, and this pressure differential is also exerted as a reactionary force on the throttling valve flange 45 in opposition to the actuating force thereby providing "feel." Because of the existing pressure differential between chambers A and B, the piston 41 moves rightwardly compressing the spring 64 in the separating counterbore 53 and actuating the piston 58 and the seal 66 further into the outlet chamber C to develop brake pressures in the wheel cylinders 13. The valve 39 and valve rod 33 are maintained in a restricted, but not closed, position relative to the piston 41 by the manually applied force in opposition to the pressure of the power fluid acting on the rightward side of the radial flange 45 of the throttling valve 39 in order to continue the braking application. This movement displaces brake fluid from the pressure producing chamber C through the brake port 78 and the conduit 14 into the wheel cylinders 13 thereby actuating the brake assemblies. The brake fluid pressure developed in the chamber C acts on the effective area of the seal 66 creating a reactionary force in opposition to the motivating force of the piston 41. When the reactionary force equals the motivating force, the rightward movement of said piston 41 ceases. In the above described case, the operator is afforded a "feel" as to the extent of the braking application in that he "feels" the created pressure differential on the effective areas of the valve rod 33 and the valve 39 which is directly proportional to the hydraulic output to the wheel cylinders 13.

When the operator releases the applied force, the established fluid pressure in the bore 57, the spring 64, and the spring 67 returns the piston 41, the piston 58, and parts associated therewith to their normal positions. When this occurs, a partial vacuum is developed in the bore 57, and the pressure differential across the valve 70 opens the valve allowing brake fluid to compensate into the bore 57. Therefore, the vacuum created in the bore 57 is overcome and any excess fluid present when the wheel cylinders are in inoperative position is returned to the reservoir line 15 through port 69'.

In the event of power failure, the operator is required to supply all the actuating force in operating the servo motor 4. As previously described, the force applied by the operator motivates the valve 37 rightwardly. Due to the absence of pressure fluid circulation through the throttling passages 47, restriction of the passage D does not develop a pressure differential to motivate the power piston 41. Consequently, the right end of the valve 39 abuts against the power piston 41 and carries the piston 41 and the piston 58 rightwardly. Upon this rightward movement, the lip of the sealing cup in the sealing assembly 51 will collapse allowing the pressure fluid to flow thereby. Therefore, the use of a reverse flow valve allowing pressure fluid recirculation is obviated. This rightward movement also displaces brake fluid from the outlet chamber C through the brake port 78 and the conduit 14 into the wheel cylinder assemblies 13 to actuate the brake assemblies. Upon release of the applied force, the brake fluid pressure in the bore 57 and the compressive force of the springs 64, 67 and 49 return the power piston 41, the piston 58, the valve rod 33 and ports associated therewith to their normal position.

The construction of the servo motor 4 completely isolates the oil based pressure fluid used in the power hydraulic system from the brake fluid employed in the braking system. Any oil based pressure fluid leaking past the sealing assembly 48 in the power piston 41 will flow through the passage 54 into the separation chamber 53, and any pressure fluid leaking past the sealing assembly 52 flows directly into the chamber 53. Therefore, any pressure fluid collecting in the separating chamber 53 will drain therefrom through the passage 55. The braking system is protected from the entry of pressure fluid thereinto by the boot 62 in the chamber 53. If any brake fluid escapes past the secondary seal 68, it will collect in the boot 62. However, if said boot 62 should rupture, the brake fluid will drain from the chamber 53 through the passage 55 and in any event no transfer of fluids will be effected in continuous operation of the servo motor without a boot 62 since no seal for one fluid wipes a surface exposed to the other fluid. Therefore, the servo motor 4 completely separates the pressure fluid in the power hydraulic system from the brake fluid of the braking system.

This invention is intended to cover all changes and modifications of the example of the invention herein chosen for purposes of the disclosure, which do not constitute departures from the spirit and scope of the invention.

What we claim is:

1. A power hydraulic servo motor comprising a housing having a bore with a piston assembly slidable therein, a variable orifice in said piston assembly through which a first pressure fluid is continuously circulated, an outlet chamber containing a second pressuer fluid, an extension for said piston assembly extending into said outlet chamber, said bore and outlet chamber being spaced apart by a separation chamber through which extends said piston assembly extension, means for restricting said variable orifice to throttle the continuous flow of said first pressure fluid to move said extension in said separation and outlet chambers, sealing means for preventing leakage of first and second pressure fluids into said separation chamber, and means in said separation chamber to prevent commingling of the first and second pressure fluids along said extension.

2. In a device of the type described including first and second chambers and a reciprocable member in one of said chambers with a portion extending into the other of said chambers for reciprocating movement therein, said first and second chambers containing first and second fluids of an incompatible nature, the improvement comprising a separation chamber intermediate said first and second chambers through which extends said portion of said reciprocable member, sealing means for said reciprocable member between said separation chamber and each of said first and second chambers, and means in said separation chamber for preventing commingling of said first and second fluids.

3. In a hydraulic servo motor including a housing having an open center power chamber containing a first pressure fluid and pressure producing chamber containing a second pressure fluid, said power chamber including therein a piston assembly having a piston member, a valve movable relative to said piston member for developing a differential in the magnitude of pressures of said first pressure fluid acting on opposite sides of said piston member, said piston assembly being movable a predetermined maximum distance in response to the pressure differential in said power chamber and having a piston working end slidably positioned in said pressure producing chamber; the improvement which comprises a separation chamber in said housing spacing said power and pressure producing chamber apart a distance greater than the maximum movement of said piston member, said piston assembly having a first extension portion extending from said power chamber into said separation chamber, first pressure fluid sealing means between said power and separation chambers slidably receiving said first extension portion therethrough, said piston assembly having a second extension portion of greater diameter than said first extension portion and extending from adjacent to said first sealing means into said pressure producing chamber and having said piston working end formed thereon, second pressure fluid sealing means for said second extension portion between said second and separation chambers, and means intermediate said extension portions of said piston assembly for stopping axial leakage flow of first and second pressure fluid along said first and second extension portions, respectively, and onto the second and first extension portions, respectively, whereby commingling of fluids on said piston assembly is prevented.

4. In a hydraulic servo motor including a housing having a power chamber containing a first pressure fluid and pressure producing chamber containing a second pressure fluid, said power chamber including a power piston and valve means movable relative to said power piston for developing a differential in the magnitude of pressures of said first pressure fluid acting on opposite sides of said power piston, said power piston being movable a predetermined maximum distance in response to the pressure differential in said power chamber and having piston extension means forming a working end positioned in said pressure producing chamber; the improvement which comprises a separation chamber in said housing spacing said power and pressure producing chambers apart a distance greater than the maximum movement of said power piston, first sealing means for said piston extension means between said power and separation chambers, second sealing means for said piston extension means between said pressure producing and separation chambers, said piston extension means having stepped circumferential surfaces adjacent to said first seal interrupting axial flow of first pressure fluid leakage along said piston extension means, and a yieldable accordion seal housing said piston extension means in said separation chamber having one end secured to said piston extension means adjacent to said stepped surface and the other end secured to the wall of said separation chamber adjacent to said second seal in circumscribing relation therewith.

5. A hydraulic servo motor comprising a housing having a bore and a pressure producing outlet chamber spaced apart by a separation chamber vented to atmosphere, a piston slidable in said bore dividing it into first and second chambers and an extension on said piston extending through said second and separation chambers and having a working end in said outlet chamber, said piston having a central chamber therein in communication with said separation chamber and a throttling passage formed through said piston in communication with said first and second chambers, pumping means continuously circulating pressure fluid through said throttling passage and first and second chambers, a throttling valve in said first chamber having one end slidable in coaxial arrangement in the central chamber of said piston and the other end positioned externally of the housing, said throttling valve including an annular radial flange positioned in said throttling passage, said throttling valve being movable relative to said piston by an applied force for reducing the size of said throttling passage for developing a pressure differential between said first and second chambers actuating said piston to move the working end of said extension in said outlet chamber, said developed pressure differential also acting on said annular flange of said throttling valve in opposition to the applied force on said throttling valve.

6. A hydraulic servo motor in an open center fluid pressure system, said servo motor comprising a housing having a bore and a pressure producing outlet chamber spaced apart by a separation chamber vented to atmosphere, a piston slidable in said bore dividing it into first and second chambers and an extension on said piston extending through said second and separation chambers and having a working end in said outlet chamber, said piston having a central chamber therein vented to atmosphere through said separation chamber and a throttling passage formed in said piston in communication with said first and second chambers, pumping means continuously circulating pressure fluid through said throttling passage and first and second chambers, a throttling valve in said first chamber having one end slidable in coaxial arrangement in the central chamber of said piston and the other end positioned externally of said housing, said throttling valve including an annular radial flange positioned in said throttling passage and movable between inoperative and operative positions, spring means in said central chamber normally biasing said throttling valve to the inoperative position in which said throttling passage in said piston is unrestricted, an annular seal between said throttling valve and piston intermediate said throttling passage and said central chamber, said throttling valve being movable to operative position relative to said piston by an applied force for reducing the size of said throttling passage to develop a pressure differential between said first and second chambers actuating said piston to move the working end of said piston extension in said outlet chamber, and said developed pressure differential also acting on said annular flange of said throttling valve in opposition to the applied force on said throttling valve.

7. A hydraulic servo motor in an open center fluid pressure system said servo motor comprising a housing having a bore a separation chamber, and a pressure producing outlet chamber aligned therein, pumping means providing a substantially continuous flow of first pressure fluid in the system, an inlet and an outlet serially connecting said bore with said pumping means, a source of second pressure fluid connected to said outlet chamber, a drain port connecting said separation chamber with the atmosphere, a piston assembly slidable in said housing bore between said inlet and outlet and having a piston extension extending through said separation chamber and having an end portion slidably disposed within said outlet chamber, a bore in said piston in communication with said separation chamber, a throttling valve member having opposite and substantially equal effective end areas one of which is slidable in said piston bore and the other being positioned externally of said housing and subjected to atmosphere, said throttling valve member providing a throttling passage in combination with said piston assembly to accommodate the continuous flow of first pressure fluid between said inlet and outlet in said housing bore, the effective areas of said piston assembly and throttling valve member in said housing bore on the outlet side thereof being substantially equal to the effective areas of said piston assembly and throttling valve member in said housing bore on the inlet side thereof to prevent movement of said piston assembly and throttling valve member in response to variations in the magnitude of pressure of the first pressure fluid in the system acting on the opposed effective areas of the piston assembly and throttling valve member, said throttling valve member being movable relative to said piston assembly in response to an external force to restrict the size of said throttling passage, said piston extension being movable to displace second pressure fluid from said outlet chamber in response to the throttling coaction between said throttling valve member and piston assembly, and means including said separation chamber to prevent commingling of the first and second pressure fluids, said latter means comprising spaced seals for said extension between said separation chamber and bore and between said separation chamber and outlet chamber, respectively, and an expansible sealing member housing said extension in said separation chamber having one end connected to said extension adjacent to said bore and the other end connected to the end wall portion of said separation chamber adjacent to said outlet chamber whereby the portion of said extension exposed to the pressure fluid in contact with one of said seals never contacts the other of said seals.

8. A hydraulic servo motor for use in an open center fluid pressure system, comprising a housing having a bore, a separation chamber, and an outlet chamber aligned therein, pumping means providing a continuous flow of first pressure fluid in the system, an inlet and an outlet for serially connecting said bore with said pumping means, an outlet port connecting said outlet chamber in a second pressure fluid circuit, a drain port connecting said separation chamber with the atmosphere, a piston assembly slidable in said bore and having an extension extending through said separation chamber and having an end portion slidably disposed in said outlet chamber, a bore in said piston, a throttling valve member having one end extending externally of said housing and the other end slidable in said piston bore, the opposing effective areas of said piston assembly, extension, and throttling valve member being in predetermined balanced proportion to prevent movement of said piston assembly, extension, and throttling valve member in response to variations in the magnitude of pressure of the first pressure fluid in the system, a vent passage in said extension connecting said piston bore with the atmosphere in said separation chamber, said throttling valve member providing a throttling passage in combination with said piston assembly to accommodate the continuous flow of first pressure fluid between said inlet and outlet in said bore, said throttling valve member being responsive to an external force to restrict the continuous flow through said throttling passage, said extension being movable to displace second pressure fluid from said outlet chamber in response to the throttling coaction between said throttling valve member and piston assembly, and means including said separation chamber to prevent commingling of the pressure fluids of the system and circuit, said latter means comprising spaced seals for said extension between said separation chamber and bore and between said separation chamber and outlet chamber, respectively, and an expansible sealing member housing said extension in said separation chamber having one end connected to said extension adjacent to said bore and the other end connected to the end wall portion of said separation chamber adjacent to said outlet chamber whereby the portion of said extension exposed to the pressure fluid in contact with one of said seals never contacts the other of said seals.

9. A hydraulic servo motor comprising a housing assembly having a first bore in one end thereof, a second bore in the other end thereof aligned with the first bore, and a separation chamber in an intermediate portion thereof isolating said first and second bores from each other, a piston assembly slidable in said first bore and having extension means projecting through said separation chamber and having a piston member slidable in said second bore and defining a pressure producing outlet chamber therein, said piston assembly dividing said first bore into inlet and reservoir chambers on opposite sides thereof with said reservoir chamber being adjacent to said separation chamber, said piston assembly having a counterbore in opposed relation with said one end of the housing assembly, rod means projecting into said housing through said one end thereof in alignment with said counterbore, a throttling valve member at the inner end of said rod means slidably received in said counterbore, resilient means normally positioning said throttling valve displaced from a bottomed position within said counterbore, said throttling valve member and said piston assembly having passageway portions communicating said inlet and reservoir chambers, said housing having an inlet leading to said inlet chamber and an outlet leading from said reservoir chamber for connection to a fluid-circulating system, and an outlet port leading from said outlet chamber for connection to a separate slave system to actuate the same in response to movement of said extension means to force hydraulic fluid from the outlet chamber, said extension means having a passage therein leading from said counterbore to said separation chamber, said separation chamber having a drain vent therein, said throttle valve member and said piston assembly having cooperable portions responsive to movement of said throttle valve member toward a bottomed position in said counterbore to restrict the passageway connection between said inlet and reservoir chambers, a seal engaging said extension means to seal said outlet chamber from said separation chamber, a second seal engaging said extension means between said reservoir chamber and said separation chamber, and a boot-like expansible sealing member engaged at one end around a portion of said housing assembly forming said second bore and at its other end around said extension means.

10. The assembly as defined in claim 9 wherein said extension means includes a portion integral with said piston assembly and extending therefrom a substantial axial distance into said separation chamber, said extension means further including a second piston having a recess of substantial depth receiving the said piston extension and extending from within said separation chamber into said outlet chamber to form said piston member, said expansible sealing member being engaged at said other end thereof with said second piston.

References Cited in the file of this patent
UNITED STATES PATENTS

| | | |
|---|---|---|
| 1,890,010 | Vickers | Dec. 6, 1932 |
| 1,967,893 | Libbey | July 24, 1934 |
| 2,844,941 | Ayers | July 29, 1958 |